United States Patent Office 3,043,875
Patented July 10, 1962

3,043,875
HALOGENATED TETRACYCLINE DERIVATIVES AND PROCESSES FOR THEIR PREPARATION
John J. Beereboom, Waterford, Hans H. Rennhard, Lyme, and Charles R. Stephens, Jr., Niantic, Conn., assignors to Chas. Pfizer & Co., Inc., New York, N.Y., a corporation of Delaware
No Drawing. Filed Feb. 8, 1960, Ser. No. 7,085
21 Claims. (Cl. 260—559)

This invention relates to new tetracycline compounds and processes for the preparation thereof. More particularly, the present invention is concerned with a process of direct halogenation of tetracyclines and the products and intermediates obtained thereby. These and other objects of this invention are obvious from the following disclosure.

The tetracycline antibiotics comprise a group of biologically active hydronaphthacene derivatives having the following essential structural features. The numbering system indicated is that employed by "Chemical Abstracts."

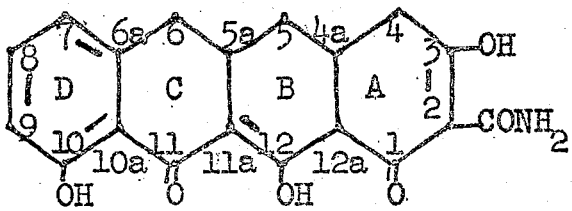

Among the biologically active members of this group are those containing the following substituent groups:

| Substituents | Common Name |
|---|---|
| 4-N(CH$_3$)$_2$, 6-OH, 6-CH$_3$, 12a-OH | tetracycline. |
| 4-N(CH$_3$)$_2$, 5-OH, 6-OH, 6-CH$_3$, 12a-OH | 5-oxytetracycline. |
| 4-N(CH$_3$)$_2$, 6-OH, 6-CH$_3$, 7-Cl, 12a-OH | 7-chlorotetracycline. |
| 4-N(CH$_3$)$_2$, 5-OH, 6-CH$_3$, 12a-OH | 6-deoxy-5-oxytetracycline. |
| 5-OH, 6-CH$_3$, 12a-OH, 6-OH | 4-desdimethylamino-5-oxytetracycline. |
| 4-N(CH$_3$)$_2$, 6-CH$_3$, 12a-OH | 6-deoxytetracycline. |
| 4-N(CH$_3$)$_2$, 12a-OH | 6-deoxy-6-demethyltetracycline. |
| 4-N(CH$_3$)$_2$, 6-OH, 6-CH$_3$, 7-Br, 12a-OH | 7-bromotetracycline. |
| 4-N(CH$_3$)$_2$, 6-OH, 7-Cl, 12a-OH | 6-demethyl-7-chlortetracycline. |
| 6-OH, 6-CH$_3$, 12a-OH | 4-desdimethylaminotetracycline. |
| 6-OH, 6-CH$_3$, 7-Cl, 12a-OH | 4-desdimethylamino-7-chlortetracycline. |
| 4-N(CH$_3$)$_2$, 6-OH, 12a-OH | 6-demethyltetracycline. |
| 12a-OH | 6-deoxy-6-demethyl-4-desdimethylaminotetracycline. |

The present new compounds are 11a-halogenated acid-stable tetracyclines having at least one hydrogen in the 6-position. It is also intended to include salts of the present new compounds with both acids and bases, and in particular, mineral acid salts and alkali and alkaline earth metal salts. Acid stable tetracyclines include 6-deoxy- and 6-deoxy-6-demethyltetracyclines as well as the corresponding 4-desdimethylamino compounds. Of course, it is well known that the parent tetracycline, e.g. tetracycline, oxytetracycline and chlortetracycline, lack acid-stability since they are readily converted to the corresponding anhydrotetracyclines in the presence of acid.

The present new compounds may be represented by the following formulae:

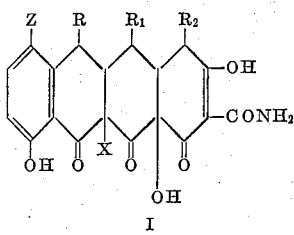

I

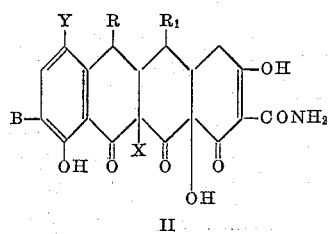

II wherein:

R is selected from the group consisting of H and CH$_3$;
R$_1$ is selected from the group consisting of H and, when R is CH$_3$, OH;
R$_2$ is selected from the group consisting of H and N(CH$_3$)$_2$;
X and Y are halogen;
Z is selected from the group consisting of H and halogen; and
B is selected from the group consisting of bromo, chloro and iodo.

The 11a-monohalotetracyclines represented by the formula:

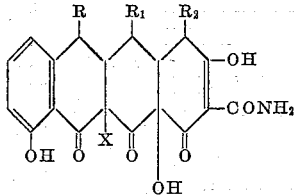

wherein X, R, R$_1$ and R$_2$ as above described are useful as intermediates for further substitution of the tetracycline nucleus, particularly in the D-ring. Where R$_2$ is hydrogen further substitution reactions may occur in the rings A and D.

It is known that the 11a-position of the tetracycline nucleus is quite reactive and, when substitution reactions are to be effected elsewhere in tetracycline nucleus, it is desirable to block the 11a-position, for example by the etherification of the enolic hydroxy group at the 11- or 12-position or transformation thereof to a so-called enamine as described in copending application Serial Number 847,867, filed October 22, 1959. The essential feature of the aforementioned ether and enamine derivatives is that the active hydrocarbon atom associated with the 11-, 11a, and 12-positions is removed. The present new 11a-halotetracyclines may be used in the same way as the above mentioned ethers and enamines, with the advantages that the 11a-halo group is readily introduced into the tetracycline molecule and readily removed by simple procedures as hereinafter described. For example, the present 11a-monohalotetracyclines serve as intermediates for the production of corresponding 7,11a-dihalotetracyclines and 7,9,11a-trihalotetracyclines. They may also be used as intermediates for the production of 7-substituted azo tetracycline compounds described in copending application Serial Number 847,867, filed October 22, 1959. Those in which $R_2$ is hydrogen are also useful as intermediates in the preparation of tetracyclines which are further substituted in the A ring. After formation of the desired substitution product, the 11a-halo blocking group may be readily removed as hereinafter described. The 11a-monohalotetracyclines have reduced in vitro antibacterial activity as compared to the parent tetracyclines though good in vivo activity is frequently noted. This property renders the compounds particularly valuable in human oral therapy especially in patients susceptible to diarrhea and other intestinal disorders since unabsorbed antibiotic is relatively inert in the lower bowel.

The biological activities of these substances measured by the standard serial dilution are tabulated below.

IN VITRO ANTIBACTERIAL ACTIVITIES

A—11a-chloro-6-deoxy-6-demethyltetracycline
B—11a-bromo-6-deoxy-6-demethyltetracycline
C—11a-fluoro-6-deoxy-6-demethyltetracycline
D—6-deoxy-6-demethyltetracycline

| | A | B | C | D |
|---|---|---|---|---|
| *Micrococcus pyogenes* var. *aureus* [1] | 6.3 | 3.12 | 6.3 | 0.19 |
| *Streptococcus pyogenes* | 3.12 | 1.56 | 6.3 | 0.19 |
| *Streptococcus faecalis* | 6.3 | 6.3 | 12.5 | 0.19 |
| *Diplococcus pneumoniae* | 3.12 | 1.56 | 12.5 | 0.19 |
| *Erysipelothrix rhusiopathiae* | 6.3 | 3.12 | 6.3 | 0.19 |
| *Corynebacterium diphtheriae* | 12.5 | 6.3 | 12.5 | 0.02 |
| *Listeria monocytogenes* | 3.12 | 3.12 | 12.5 | 0.19 |
| *Bacillus subtilis* | 0.39 | 0.78 | 3.12 | 0.04 |
| *Lactobacillus casei* | 12.5 | 12.5 | 12.5 | 0.19 |
| *Bacterium ammoniagenes* | 3.12 | 1.56 | 12.5 | 0.19 |
| *Aerobacter aerogenes* | 25.0 | 6.3 | 50 | 1.56 |
| *Escherichia coli* | 12.5 | 6.3 | 12.5 | 1.56 |
| *Proteus vulgaris* | >100.0 | >100 | >100 | 100 |
| *Pseudomonas aeruginosa* | >100.0 | >100 | >100 | 100 |
| *Salmonella typhosa* | 25.0 | 6.3 | 100 | 1.56 |
| *Salmonella pullorum* | 12.5 | 6.3 | 25 | 0.78 |
| *Klebsiella pneumoniae* | 12.5 | 6.3 | 50 | 1.56 |
| *Neisseria gonorrhoeae* | 3.12 | 1.56 | 12.5 | 0.19 |
| *Haemophilus influenzae* | 1.56 | 0.78 | 6.3 | 0.09 |
| *Shigella sonnei* | 12.5 | 12.5 | 50 | 1.56 |
| *Erwinia amylovora* | 100 | 12.5 | 100 | |
| *Phytomonas tumefaciens* | | | 3.12 | |
| *Brucella bronchiseptica* | 0.78 | 0.78 | | 0.19 |
| *Malleomyces mallei* | 0.3 | 6.3 | .25 | |
| *Vibrio comma* | 0.78 | 0.78 | 3.12 | |
| *Pasteurella multocida* | 3.12 | 3.12 | 12.5 | 0.39 |
| *Mycobacterium 607* | 1.56 | 3.12 | >100 | |
| *Mycobacterium berolinense* | 0.78 | 1.56 | 100 | |
| *Candida albicans* | >100 | >100 | >100 | |
| *Pityrosporum ovale 12078* | >100 | >100 | >100 | |

Antibiotic resistant strains of *Micrococcus pyogenes* var. *aureus*

| | A | B | C | D |
|---|---|---|---|---|
| 376 [2] | 50 | 12.5 | >100 | 3.12 |
| 400 [3] | 12.5 | 6.3 | 50 | 1.56 |

[1] The MIC of tetracycline against *Micrococcus pyogenes* var. *aureus* is 0.39.
[2] Resistant to tetracycline at a concentration of 100 mcg./ml.
[3] Resistant to tetracycline at a concentration of below 50 mcg./ml.

When these in vitro tests were repeated in the presence of human serum, similar results were obtained demonstrating that the present antibiotic compounds are not deactivated in the blood. When these compounds were tested in vivo through both the oral and parenteral route in mice, they showed activity comparable to tetracycline against infection produced with tetracycline sensitive microorganisms, e.g. *Micrococcus pyogenes* var. *aureus*. For example, the $PD_{50}$ (PD=protective dose) for 11a-chloro-6-deoxy-6-demethyltetracycline against an infection produced with *Micrococcus pyogenes* var. *aureus*, is 5.5 mg./kg. (orally) and 1.3 mg./kg. (parenterally) while the corresponding $PD_{50}$ for tetracycline are 5.3 and 0.68 mg./kg. respectively. The high order of in vivo activity of the present 11a-halotetracyclines is certainly unexpected in view of the hereindescribed in vitro activities.

The present new compounds may be formulated into various compositions analogous to the parent compounds. They are useful in therapy particularly because of the lack of appreciable activity in the intestines while providing systemic protection against disease causing microorganisms. They are also useful therapeutically in feeds or as growth stimulants, in veterinary practice, and in agriculture.

For human therapy, the usual oral dosage of the present 11a-halotetracyclines is from about 0.4 to about 2 g. per day for the average adult. The products are formulated into capsules or tablets containing from 25 to 250 mg. of antibiotic on an activity basis. Suspensions or solutions in various vehicles are prepared having concentrations ranging from 5 to 125 mg./ml. For parenteral administration intramuscularly or intravenously, the daily dose is reduced to about 0.1 to 1.0 g. Intramuscular formulations comprise solutions of the antibiotic at concentrations ranging from 50 to 100 mg./ml. Intravenous administration is by means of isotonic solutions having antibiotic concentration of about 10 mg./ml. Both types of parenteral product are conveniently distributed as solid compositions for reconstitution. In all instances, of course, the attending physician will indicate the dosage to fit the needs of a particular patient. For children, smaller doses are generally used.

The 7,11a-dihalotetracyclines represented by the formula:

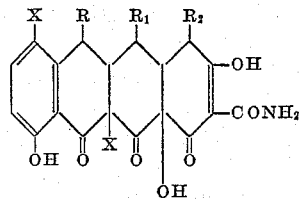

wherein X, R, $R_1$ and $R_2$ as described above are useful as intermediates for the preparation of corresponding 7-halotetracyclines described in copending application Serial Number 847,867, filed October 22, 1959, and also for the preparation of 9-substituted tetracycline compounds also described in the same copending application, by procedures involving the removal of halogen, as hereinafter described, after introduction of the desired substituent. The 7,9,11a-trihalodesdimethylaminotetracyclines are intermediates for the production of corresponding 7,9-dihalotetracyclines and are also intermediates for the preparation of ring A-substituted tetracyclines, e.g. tetracyclines further substituted in ring A with such groups as halogen, particularly bromo and iodo in the 4-position which will permit the introduction of a dimethylamino group, or other such amino groups, into the 4-position.

The present new halotetracyclines in which the halogen is chlorine, bromine or iodine are prepared by a process which consists of merely contacting a tetracycline represented by the following formulae:

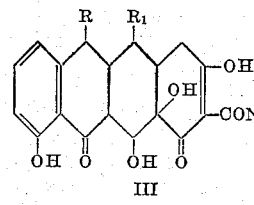
III

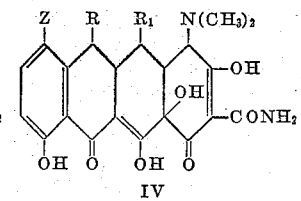
IV in which R, $R_1$ and Z are as described above or mineral salts thereof with at least an equimolar amount of a halogenating agent in a reaction-inert organic solvent.

When an equimolar amount of halogenating agent is employed, the principal product is the corresponding 11a-halo (Cl, Br, or I) tetracycline. When Z is hydrogen in Formula IV slight excesses of halogenating agent, up to 10 mole-percent, may be also used in preparing the 11a-monohalo compounds. Larger excesses of halogenating agent may result in reduction of the yield of the desired monohalo product. Of course when Z is halogen, large excess of halogenating agent may be used but provide no appreciable advantage.

When two molar equivalents of halogenating agent are used with a compound of Formula IV in which Z is hydrogen, the corresponding 7,11a-dihalo-tetracycline is obtained. For best results in this reaction an acid catalyst is preferred in the reaction mixture for D-ring substitution. When the halogenating agent is a chlorinating agent, the corresponding 7,11a-dichlorotetracycline is obtained; when a brominating or iodinating agent, the corresponding 7-bromo- or 7-iodotetracycline is obtained, apparently through disproportionation of the mobile 11a-bromo or iodo, or through interaction with the reaction medium. The product may also contain the 7,11a-dibromo (or diiodo) compound.

When the starting compound is an 11a-halo (Cl, F, I or Br) tetracycline only an equimolar amount of halogenating agent is required although excess may be used with no appreciable advantage. When the 11a-halogen is bromine or iodine, a 7-monohalotetracycline is obtained in the presence of an acid catalyst, which appears to be preferable for production of substantial amount of 7-substituted product. When the 11a-halogen is chlorine or fluorine, the latter prepared by a procedure hereinafter described, the products obtained are 7-halo-11a-chloro- or fluorotetracycline.

When the starting compound is a desdimethylaminotetracycline, the acid catalyst does not appear to be as desirable as in the case of the tetracyclines. Excellent results are obtained without acid catalysts by merely contacting the starting desdimethylaminotetracycline with the halogenating agent in a reaction-inert solvent. The molar ratio of halogenating agent to starting compound determines the product obtained. With an equimolar ratio, there is obtained the 11a-halo compound; with a 2:1 molar ratio, the 7,11a-dihalo compound and with a 3:1 molar ratio, the 7,9,11a-trihalo compound.

It is surprising that the desdimethylaminotetracyclines yields a trihalo product under comparatively mild conditions. The formation of 7,9,11a-trihalotetracyclines require more selective halogenation conditions for high yields, though small amounts of these trihalo compounds are frequently formed as by-products along with 9,11a-dihalotetracyclines in the hereindescribed method of producing 7,11a-dihalotetracyclines.

Suitable halogenating agents for the present process include bromine; chlorine; iodochloride; iodobromide; N-chloro-, N-iodo-, and N-bromo lower alkanoic acid amide, e.g. N-chlor-, and N-bromacetamide; hydrocarbon dicarboxylic acid imides, e.g. N-chloro-, N-bromo- and N-iodosuccinimide, phthalimide, and the like and N-lower-alkanoyl anilines e.g. N-bromoacetanilide, propionanilide and the like; 3-chloro-, 3-bromo-, 3,5-dichloro and 3,5-dibromo-5,5-dimethyl-hydantoin; pyridinium perbromide and perchloride hydrohalides, e.g. pyridinium perbromide hydrobromide; pyridinium perchloride hydrochloride; and lower alkyl hypochlorites, e.g. tertiary butylhypochlorite. It is obvious that, in general, any halogenating agent commonly employed in the art is operable, but the above are preferred.

By "reaction-inert solvents" as employed herein is meant a solvent which, under the conditions of the reaction, does not react in an undesired manner with either starting compounds or final products. A minimum of laboratory experimentation will permit the selection of suitable solvents for the present process. Exemplary of such solvents are dioxane, acetic acid, tetrahydrofuran, carbontetrachloride, chloroform, methyl ether of diethylene glycol (diglyme), and the methyl ether of ethylene glycol (monoglyme). Water may also be used as solvent for the present process, particularly when a mineral acid is used as catalyst for D ring substitution reaction. Of course, when a chlorinating agent is used because of the stability of the 11a-chlorine, an acid may be present even in monochlorinating. Particularly effective solvents for chlorination are trihaloacetic acids, e.g. trifluoacetic and trichloroacetic acids, which serve both as solvent for the reaction and catalyst for the D-ring substitution.

In the foregoing, reference is made to an acid catalyst for D ring substitution reactions. A variety of such acids may be employed in the present process. These include mineral acids, e.g. hydrochloride, hydrobromic, hydriodic, sulfuric and phosphoric; Lewis acids, e.g. boron trifluoride, stannic chloride and bromide, zinc chloride, ferric chloride and bromide, aluminum chloride and bromide; and organic carboxylic acids and in particular halosubstituted alkanoic acids, e.g. trifluoro and trichloro lower alkanoic acids, preferably trifluor- and trichloracetic acid. A minimum of routine laboratory experimentation will enable the selection of suitable acids for D ring halogenation. For example, small scale reactions may be carried out with the tetracycline compound, the halogenating agent, and the selected acid in an inert solvent. Paper chromatography may then be used to detect the presence of D-ring halogenated tetracycline using known solvent systems. Exemplary of such solvent systems are the following: ethyl acetate saturated with water as the mobile phase and MacIlvaine's pH 3.5 buffer as the immobile phase; and 20:3 toluene:pyridine saturated with pH 4.2 buffer as the mobile phase and MacIlvaine's pH 4.2 buffer as the immobile phase. The halotetracyclines show a differential mobility and can be distinguished from starting compound, the behavior of which may be predetermined in the same solvent system.

The acid catalyst may be used in trace amounts but it is generally preferred to employ excess to ensure rapid and complete reaction. As previously mentioned liquid acids may also be used as solvent for the reaction e.g. aqueous or concentrated mineral acids, trifluoracetic and the like. When a mineral acid serves as catalyst, it is usually preferred to use an acid containing the same anion as the halogen to be introduced e.g. concentrated hydrobromic acid for bromination. If a mineral acid salt of the tetracycline starting compound is used, this preference also applies but, of course, is not essential.

Reaction temperature does not appear to be critical in the present processes since the reaction is initiated even at room temperature and at lower temperatures on contacting the reagents. The use of higher temperatures merely serves to ensure completeness of the reaction and shorten the time required. The use of temperatures higher than about 100° C. provides no appreciable advantage and should be avoided since it may result in decreased yield of the desired product. At room temperature, the reaction is complete in as little as 5 to 30 minutes. Of course, the reaction time will depend on the amounts of materials employed, large-scale preparations requiring longer periods than laboratory scale.

After the reaction is complete, the products are obtained by conventional procedures of isolation. One such procedure involves the dilution of the reaction mixture with a non-solvent, e.g. ether, after which the separated product is collected. The products as obtained are usually of sufficient purity to be used for further substitution reactions but, if desired, they may be recrystallized from suitable solvents such as lower alkanols.

The present 11a-fluorotetracyclines are prepared by contacting a tetracycline of Formula III or IV with perchloryl fluoride in a reaction inert solvent. For the production of substantial amounts of the desired 11a-fluorotetracycline, it is necessary to carry out the reaction in the presence of a base. While a variety of bases may be used, it is preferred to use alkali metal lower alkoxides and alkali and alkaline earth metal hydroxides, carbonates, and bicarbonates as catalyst. Other bases, such as organic 3° amines e.g. trialkylamines such as triethylamine, nitrogen heterocyclics such as pyridine and the like are operable but offer no advantage over the more economical alkoxides. The preferred bases are alkali metal lower alkoxides such as sodium methoxide, potassium ethoxide and lithium propoxide.

It is generally advisable to utilize at least one equivalent of base per mole of starting compound. Lesser amounts of course may be used but lower product yields may be realized in so doing. The use of more than an equivalent base is optional since though operable, it provides no appreciable advantage.

Reaction temperature does not appear to be critical since the reaction is operable over a wide range of temperature. However, it is recommended that temperatures higher than 30° C. be avoided since appreciable side reactions may occur resulting in reduced product yield. The preferred reaction temperature is from about −10° to about 10° C. The use of lower temperatures, while operable, usually necessitates prolonged reaction periods and thus is not preferred.

The fluorinating agent is gaseous under ordinary conditions but at low temperature may be maintained in the liquid state. The perchloryl fluoride may be introduced into the reaction mixture portionwise or all at once in either physical state. It is conveniently utilized in the gaseous form and, as such may be continuously bubbled through the reaction mixture until monofluorination is complete. Alternatively the reaction mixture may be saturated with the gas and the reaction simply allowed to proceed. A further method involves introduction of the gas under pressure. For this procedure, conventional pressure vessels are useful as reaction containers.

Although at least a molar equivalent of perchloryl fluoride is required per mole of substrate, it is usually more convenient to use excess reagent, particularly when the gaseous form is employed.

Reaction-inert solvents for the present fluorination process are readily determinable by routine laboratory experimentation. Of course, the selected solvent should dissolve the tetracycline starting compound. Such solvents include those described above. Preferred solvents for the present process are lower alkanols, e.g., methanol, ethanol and propanols, since their use gives best results.

In the foregoing, mention is made of the removal of the 11a-halogen from the final products. Conventional procedures such as treatment of the 11a-halotetracyclines (a) With dilute aqueous hydriodic acid, (b) With zinc metal in the presence of a proton donor, such as acetic acid, (c) In the case of 11a-bromo and 11a-iodo compounds, by boiling the product with a solvent capable of reacting with bromine or iodine (acetone, methanol, etc.), (d) Alternatively treatment with sodium iodide in organic solvent, followed by treatment of the resultant iodo compound with metallic zinc, and (e) Treatment with metal sulfites and hydrosulfites, particularly the alkali metal (Na, K, Li) salts are useful. Sulfites do not appear to be effective in removing 11a-chloro or fluoro, but readily reduce off 11a-bromo or iodo. Hydrosulfites, on the other hand, are particularly effective in removing all 11a-halogens. The reaction appears to be instantaneous when carried out in water, and for this reason this solvent is preferred. However, other solvents, e.g. alkanols may be employed. The reaction is rapidly completed at room temperature.

The procedure under (d) is found to be very inefficient in that the first reaction appears to be at best quite incomplete. It has been surprisingly found that 11a-halotetracyclines may be readily dehalogenated by simultaneous treatment of a compound of the formulae:

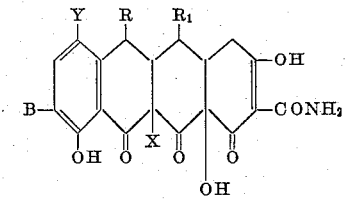

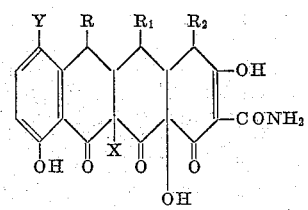

wherein R, $R_2$, Y, X and $R_1$ are as previously described, and B is fluoro, chloro or bromo; and mineral salts thereof, with zinc and sodium iodide in a reaction-inert organic solvent. Suitable solvents are readily determinable by routine laboratory experimentation and include solvents for the tetracycline starting compound which are capable of dissolving at least in part, the sodium iodide reagent. Preferred solvents are lower alkanones such as acetone, butanone and pentanones since their use gives best yields. Theoretically, only equivalent amounts of zinc and sodium iodide are required for the present process but it is found advisable to use excesses of same in particular to shorten reaction time and obtain optimum yields. Excesses of up to 1000 mole-percent and higher are successfully used in the present process. Temperature does not appear to be critical but merely affects the reaction rate. The use of high temperatures, for example up to the reflux temperature of the reaction mixture, merely shortens the reaction time. For example, with the solvent acetone, the reaction is complete in as little as 30 minutes when the mixture is maintained at reflux temperature.

After the reaction is complete the products are obtained by filtration and concentration of the reaction mixture. The products may be further purified by standard procedures, e.g., recrystallization from suitable solvents.

It has also been surprisingly found that the 11a-halogen may be removed from the dihalotetracyclines of this invention by catalytic hydrogenation. This is indeed unexpected since the 7-halogen is also susceptible to catalytic hydrogenation.

The hydrogenation is carried out by contacting an inert organic solvent solution of the starting dihalotetracycline with hydrogen gas in the presence of a noble metal catalyst. The hydrogenation may be carried out at atmospheric or superatmospheric pressures of hydrogen. It is usually preferred to use from about 1 to about 3 atmospheres of hydrogen gas at temperatures ranging up to 50° C. Temperatures of from about 25° to about 35° C. appear to give optimum results and are preferred. The hydrogenation is continued until 1 equivalent of hydrogen gas is taken up. At this point the rate of absorption of hydrogen gas diminishes and the reaction is discontinued. The noble metal catalysts contemplated by the present process are palladium, platinum, osmium, ruthenium, iridium and rhodium which may be advantageously suspended on carbon, barium sulfate and the like. Suitable reaction inert solvents for the hydrogenation are dioxane, lower alkanols, tetrahydrofuran, diglyme and monoglyme.

After the reaction is complete, the catalyst is filtered off and the product obtained by standard procedures.

6-deoxy and 6-deoxy-6-demethyltetracyclines are described in copending application Serial Number 841,928, filed September 24, 1959. The 6-demethyltetracyclines are described in U.S. Patent No. 2,878,289. The corresponding 4-desdimethylaminotetracyclines are described in copending application Serial Number 841,929, filed September 24, 1959.

The herein described 7,9-11a-trihalo-4-desdimethylaminotetracyclines are also of particular value in preparing the new and useful corresponding 7,9-dihalo compounds of the following formula:

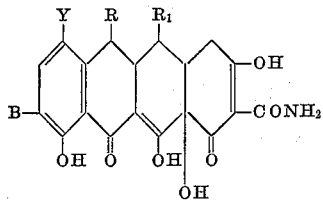

in which R is selected from the group consisting of H, OH and CH₃; R₁ is selected from the group consisting of H and, when R is CH₃, OH; Y is halogen; and B is selected from the group consisting of bromo, chloro and iodo.

The 7,9-dihalotetracyclines possess surprisingly high activity against disease-causing microorganisms, and particularly against antibiotic-resistant strains of such microorganisms. They are useful for human and animal therapy in the same way as the parent tetracycline antibiotic, the efficacy of which is well documented in the medical literature. The 7,9-dihalo compounds may be used in the acid form or in the form of salts with pharmaceutically acceptable cations, particularly pharmaceutically acceptable alkali; and alkaline earth metal cations.

It is specifically intended to include within the purview of this invention the acid and base salts of the present new amphoteric tetracyclines, and the base salts of the present new acidic tetracyclines i.e. the 4-desdimethylamino compounds. In the case of the therapeutically active tetracyclines, salts formed with pharmaceutically aceptable acids and bases are suitable for administration to a host in suitable dosage form. Those salts formed with pharmaceutically unacceptable acids and bases are of value in isolation and purification of the present new tetracyclines and also in the preparation of pharmaceutically acceptable salts.

The following examples are given by way of illustration and are not to be construed as limitations of this invention many variations of which are possible without departing from the scope and spirit thereof.

*Example I*

11a-CHLORO-6-DEMETHYL-6-DEOXYTETRACYCLINE

A mixture of 2 grams of 6-demethyl-6-deoxytetracycline hydrochloride and 0.8 g. of N-chlorosuccinimide in 30 ml. of CF₃COOH is stirred and heated on a steam bath for 5 minutes. After cooling, the mixture is added dropwise to 500 ml. of stirred ether of 0° C. The product separates and is then slurried four times with ether.

*Example II*

7,11a-DICHLORO-6-DEMETHYL-6-DEOXYTETRACYCLINE

The product of Example I is stirred with 0.8 g. of N-chlorosuccinimide in 17 ml. of trifluoracetic acid on a steam bath for thirty minutes. After cooling, the mixture is added dropwise to 500 ml. of stirred ether at 0° C. The hard, oily gum is separated and slurried four times with ether to obtain the product.

The product is also obtained from 6-deoxy-6-demethyltetracycline by this procedure employing 1.6 g. in lieu of 0.8 of the chlorinating agent.

A sample of the product in 0.01 N-methanolic HCl shows maxima on ultraviolet absorption analysis at 270 and 358 mμ. Infrared analysis is a KBr pellet at a concentration of 1% shows absorption at the following wavelengths: 2.95–3.45, 3.36, 4.15, 5.73, 5.87, 6.10 (6.40), 6.90.

*Example III*

7-BROMO-6-DEOXY-6-DEMETHYLTETRACYCLINE

A mixture of 2.5 g. of 6-deoxy-6-demethyltetracycline hydrochloride and 10 ml. of a solution of bromine in acetic acid (1.6 g. of bromine) in 25 ml. of trifluoracetic acid is heated on a steam bath for 5 minutes. The heavy orange precipitate which first forms on mixing the starting reagents slowly dissolves to give a dark green solution. Heavy fuming of the mixture occurs during heating. After cooling, 100 ml. of methanol is added and a negative starch-iodide test indicates that all of the bromine has reacted. The solvent is evaporated in vacuo to give a taffy-like residue which is triturated with dry ether to yield amorphous product which is collected. After 1.5 g. of this product is dissolved in 100 ml. of hot methanol and 20 drops of 48% hydrobromic acid is added. The mixture is evaporated to 75 ml. and cooled. A yellow crystalline solid precipitates giving 1.3 g. of 7-bromo-6-deoxy-6-demethyltetracycline hydrobromide. An ultraviolet absorption maximum occurs at 268 mμ with a broad plateau (maximum) occurring at 343 to 367 mμ when this product is dissolved in 0.01 N methanolic HCl. Ultraviolet maxima appear at 243 and 383 mμ in 0.01 N methanolic NaOH. Infrared absorption maxima occur at 2.99, 3.20, 6.05, 6.25, 6.85, 7.15, 7.40, 7.80, 8.20 and 8.85μ (1% dilution in potassium bromide pellet).

This product is also obtained from 11a-bromo-6-deoxy-6-demethyltetracycline by the same procedure as described in this example.

*Example IV*

7-BROMO-6-DEOXY-5-OXYTETRACYCLINE

A mixture of 50 mg. (0.1 mmole) of 6-deoxy-5-oxytetracycline, 0.21 ml. of a solution of 1.6 g. of Br₂ in 10 ml. of acetic acid and 0.5 ml. of trifluoroacetic acid is heated on a steam bath for 5 minutes. The initial heavy orange precipitate slowly dissolves on heating the mixture, after which it is cooled and diluted with 5 ml. of ether to precipitate a pale cream solid. The product, 50 mg. is then filtered and washed with ether. Ultraviolet absorption maxima occur at 225, 266 and 343 and 365 mμ in 0.01 N methanolic HCl. Bioassay of the product shows 370 mcg. of tetracycline activity per milligram. Infrared analysis shows maxima at 2.98, 6.18, 6.35, 6.88, 7.06, 7.38, 7.73, 8.26, 8.90, 9.52, 9.98, 10.7, 12.0, 12.48.

*Example V*

11a-FLUORO-6-DEMETHYL-6-DEOXYTETRACYCLINE

A suspension of 4.6 g. (10 mmoles) of 6-demethyl-6-deoxytetracycline hydrochloride in 60 ml. of methanol is cooled to 0° C. and nitrogen gas bubbled through. A solution of 20 ml. of a normal solution of sodium methoxide in methanol (20 mmoles) is added and the mixture saturated with perchloryl fluoride. The mixture is then maintained in a refrigerator for 24 hours during which time the suspension becomes a clear yellow solution which deposits 3.5 g. of cream colored crystals of the product as the chlorate salt. The filtrate yields a second crop of crystals of less pure product.

Ultraviolet analysis shows maxima at 270 and 350 mμ.

*Example VI*

11a-HALOGENATION

The tetracycline starting compound is dissolved in the selected solvent and an equivalent of chlorinating, brominating or iodinating agent is added to the resulting mixture. After stirring at room temperature for ¼ to 24 hours, the mixture is added dropwise to a non-solvent, usually ether, at about 0° C. The product separates and is collected by filtration. It desired, the product is repulped several times with ether.

This procedure is used for the preparation of the following 11a-halotetracyclines from corresponding tetracyclines from corresponding tetracyclines:

11a-bromo-6-deoxy-6-demethyltetracycline
11a-bromo-6-deoxytetracycline
11a-bromo-6-deoxy-5-oxytetracycline
11a-iodo-6-deoxy-6-demethyltetracycline
11a-iodo-6-deoxytetracycline
11a-chloro-6-deoxy-4-desdimethylaminotetracycline
11a - bromo - 6 - deoxy-6-demethyl-4-desdimethylamino-tetracycline
7-chloro-11a-bromo-6-deoxy-6-demethyltetracycline
7-fluoro-11a-chloro-6-deoxytetracycline
7-bromo-11a-chloro-6-deoxytetracycline
7,11a-dibromo-6-deoxy-6-demethyltetracycline
7,11a-dibromo-6-deoxytetracycline Halogenating agents useful in this regard include: chlorine, bromine, iodochloride, iodobromide, N-bromosuccinimide, N-chlorosuccinimide, N-iodosuccinimide, N-bromacetamide, N-chloroacetamide, N-iodoacetamide, N-chloracetanilide, N-bromophthalimide, 3 - chloro-3,5-dimethylhydantoin, 3-bromo-5,5-dimethylhydantoin, 3,5-dibromo - 5,5 - dimethylhydantoin, 3,5-dichloro-5,5-di methylhydantoin, tertiary butylhypochlorite, pyridinium perchloride and perbromide salts. Reaction-inert solvents include dioxane, tetrahydrofuran, diglyme, monoglyme, water, carbon tetrachloride and chloroform.

*Example VII*

11a-FLUORINATION

The tetracycline compound in the selected solvent containing a basic catalyst is treated with perchloryl fluoride at atmospheric or super-atmospheric pressure. For the latter, a conventional pressure vessel is suitable. The mixture is preferably allowed to stand at a temperature between −10° and 10° C., usually at 0° to 5° C. At the end of about a 24 hour period, the product usually precipitates. In some cases, it may be necessary to effect precipitation by concentration and/or the addition of a non-solvent such as ether.

Using this procedure, the following 11a-fluorotetracyclines are prepared from corresponding starting compounds:

11a-fluoro-6-deoxytetracycline
11a - fluoro - 4 - desdimethylamino - 6 - deoxy - 6 - demethyltetracycline
11a-fluoro-6-deoxy-5-oxytetracycline
7-chloro-11a-fluoro-6-deoxytetracycline
7-bromo-11a-fluoro-6-deoxy-6-demethyltetracycline
11a-fluoro-4-desdimethylamino-6-deoxytetracycline Suitable reaction solvents are preferably lower alkanols, e.g. methanol and ethanol. Additional solvents are dioxane, water, tetrahydrofuran, diglyme and monoglyme. Basic catalysts include sodium methoxide, potassium ethoxide, lithium propoxide, sodium hydroxide, lithium hydroxide, potassium carbonate and sodium bicarbonate and carbonate.

In fluorinating 4-desdimethylaminotetracyclines, the reaction is preferably carried out in lower alkanols and the product precipitated by water addition after about 10–20 minutes reaction time.

*Example VIII*

7-HALOGENATION

*Method A.*—The tetracycline starting compound in suitable solvents containing an acid catalyst is heated on a steam bath with at least two equivalents of halogenating agent for 30 minutes. After cooling the mixture is added dropwise to stirred ether at 0° C. The product separates, is collected and then slurried several times with ether.

When the 7-halogen is bromo or iodo, the product may contain minor amounts of the corresponding 7,11a-dihalotetracycline. It may be purified by heating in acetone or methanol (serving as halogen acceptors) or alternatively a solution of a mineral acid (hydrohalic, perchloric or sulfuric) in acetone or methanol, followed by evaporation and crystallization.

*Method B.*—To the 11a-halotetracycline starting compound in suitable solvent containing an acid catalyst is added at least one equivalent of halogenating agent and the mixture allowed to stand at room temperature for about three to four hours, after which the product is collected by the usual procedure (e.g. Method A).

When the 11a-halogen is bromo or iodo, the final 7-halotetracycline may also contain minor amounts of 7-halo-11a-bromo or iodo compound. Purification of the product may be carried out as in Method A. Suitable solvents for both Methods A and B include trifluoracetic, trichloracetic, 48% aqueous hydrobromic acid, sulfuric acid, hydrochloric acid, and phosphoric acid (which may act as catalyst as well as solvent) as well as dioxane, tetrahydrofuran, diglyme, monoglyme, carbon tetrachloride and chloroform. Acid catalysts include the aforementioned as well as boron trifluoride, stannic chloride and zinc chloride.

Under the procedure of Method A, the following 7-halotetracyclines are prepared from corresponding starting compounds using the halogenating agents described in Example VII.

7,11a-dichloro-6-deoxytetracycline
7-bromo-6-deoxytetracycline
7-iodo-6-deoxytetracycline
7-bromo-6-deoxy-6-demethyltetracycline
7,11a-dichloro-6-deoxy-5-oxytetracycline Using the procedure of Method B, the following 7-halotetracyclines are prepared from corresponding 11a-halo compounds using the halogenating agents described in Example VII.

7-chloro-6-deoxy-6-demethyltetracycline (from the corresponding 11a-bromo compound)
7,11a-dichloro-6-deoxy-6-demethyltetracycline (from the corresponding 11a-chloro compound)
7-bromo-6-deoxytetracycline (from the corresponding 11a-bromo compound)
7-iodo-6-deoxytetracycline (from the corresponding 11a-iodo compound)
7,11a-dichloro-6-deoxy-5-oxytetracycline
7-iodo-11a-chloro-6-deoxytetracycline
7-bromo-11a-chloro-6-deoxytetracycline
7-chloro-11a-fluoro-6-deoxy-6-demethyltetracycline

*Example IX*

HYDROGENATION OF 11a-HALOTETRACYCLINES

Approximately one gram of the 11a-halotetracycline in 50 ml. of solvent containing 100 mg. of 5% palladium on carbon is treated with hydrogen gas in a conventional shaker apparatus at a pressure of from one to three atmospheres at room temperature. The reaction is continued until one equivalent of hydrogen gas is taken up.

For example, 1.16 g. of the product of Example II is added to 50 ml. of methanol containing 100 mg. of 5% palladium on carbon. The mixture is treated at a pressure of 3 atmospheres of hydrogen gas and a temperature of 32° C. The hydrogenation stops after 22 minutes and the mixture is filtered and the resulting light red solution evaporated to dryness at reduced pressure. The residue is slurried in 25 ml. of ether, filtered and dried to obtain 0.92 g. of yellow solid, 7-chloro-6-deoxy-6-demethyltetracycline.

Using this general procedure, the aforementioned 11a-halotetracycline are hydrogenated to the corresponding 11a-dehalo products employing a palladium catalyst, such as palladium supported on barium sulfate, ruthenium, osmium, rhodium, iridium and platinum in solvents such as the lower alkanols, dioxane, tetrahydrofuran, diglyme and monoglyme.

Example X
11a-DEHALOGENATION

Equivalent amounts of 11a-halotetracycline, sodium iodide and powdered zinc metal are refluxed in acetone for 30 minutes. The reaction mixture is cooled, filtered and concentrated under reduced pressure to obtain the 11a-dehalotetracycline compound.

Employing this procedure, the above described 11a-halotetracyclines are converted to the corresponding 11a-dehalo compounds. Similar results are obtained when butanone and/or pentanone are used in lieu of acetone.

Example XI
7,9-DIBROMO-11a-FLUORO-6-DEOXY-6-DEMETHYL-4-DESDIMETHYLAMINOTETRACYCLINE A mixture of 2 g. of 11a-fluoro-6-deoxy-6-demethyl-4-desdimethylaminotetracycline and 2 g. of N-bromosuccinimide in 60 ml. of acetic acid is allowed to stand at room temperature. The product crystallizes directly from the mixture within one hour and is collected by filtration.

This product is also obtained from the corresponding 7-bromo-11a-fluorotetracycline compound by this procedure.

Example XII
7,9-DIBROMO-6-DEOXY-6-DEMETHYL-4-DESDIMETHYLAMINOTETRACYCLINE The product of Example XI (25 mg.) is dissolved in 2 ml. of acetic acid and 25 mg. of powdered zinc is added to the mixture. The mixture is allowed to stand at room temperature for 15 minutes after which it is diluted with acetone, filtered and the filtrate freeze-dried to obtain the product.

Example XIII
7,9,11a-TRIBROMO-6-DEOXY-6-DEMETHYL-4-DESDIMETHYLAMINOTETRACYCLINE To a mixture of 2 g. of 6-deoxy-6-demethyl-4-desdimethylaminotetracycline in 30 ml. of acetic acid is added dropwise a solution of 4 g. of N-bromosuccinimide in 30 ml. of acetic acid. The mixture is allowed to stand for 48 hours at room temperature and the product is then precipitated by water addition.

This product is also obtained by the bromination of the corresponding 11a-bromo compound and 7,11a-dibromo compound employing the same procedure.

Example XIV
7,9-DIBROMO-6-DEOXY-6-DEMETHYL-4-DESDIMETHYLAMINOTETRACYCLINE The product obtained in Example XIII is refluxed in acetone for 2 hours after which the reaction mixture is stripped of solvent to give this product.

Example XV
7,9-DICHLORO-11a-FLUORO-6-DEOXY-6-DEMETHYL-4-DESDIMETHYLAMINOTETRACYCLINE This product is obtained by the procedure of Example XI by employing N-chlorosuccinimide as halogenating agent.

Example XVI
7,9,11a-TRICHLORO-6-DEOXY-6-DEMETHYL-4-DESDIMETHYLAMINOTETRACYCLINE This product is obtained by the procedure of Example XIII employing N-chlorosuccinimide as halogenating agent.

Example XVII
7,9-DIBROMO-11a-CHLORO-6-DEOXY-6-DEMETHYL-4-DESDIMETHYLAMINOTETRACYCLINE Two grams of 11a-chloro-6-deoxy-6-demethyl-4-desdimethylaminotetracycline is dissolved in 10 ml. of acetic acid containing 1.6 g. of bromine. The mixture is allowed to stand for 36 hours after which it is diluted with water and the product collected by filtration.

The product is converted to 7,9-dibromo-6-deoxy-6-demethyl-4-desdimethylaminotetracycline by the procedure of Example XII.

Example XVIII
7-BROMO-11a-FLUORO-6-DEOXY-6-DEMETHYL-4-DESDIMETHYLAMINOTETRACYCLINE To a solution of 2.5 g. of 11a-fluoro-6-deoxy-6-demethmethyl-4-desdimethylaminotetracycline in 25 ml. of trifluoroacetic acid is rapidly added 5 ml. of a solution of bromine in acetic acid (0.8 g. of bromine) with the formation of a precipitate. The mixture is heated on a steam bath for ten minutes and is then diluted with water and the product separated, is filtered and dried.

On treatment with Zn and acetic acid, this product yields 7-bromo-6-deoxy-6-demethyl-4-desdimethylaminotetracycline.

Example XIX
7,9-DIBROMO-11a-FLUORO-6-DEOXY-6-DEMETHYL-4-DESDIMETHYLAMINOTETRACYCLINE To a solution of 2.5 g. of 11a-fluoro-6-deoxy-6-demethyl-4-desdimethylaminotetracycline in 25 ml. of trifluoroacetic acid is slowly added 10 ml. of a solution of bromine in acetic acid (1.6 g. of bromine). No precipitate forms. The mixture is heated on the steam bath for 30 minutes and then diluted with water to obtain the product.

On treatment with zinc and acetic acid, this product yields 7,9-dibromo-6-deoxy-6-demethyl-4-desdimethylaminotetracycline.

Example XX
7-BROMO-9-CHLORO-11a-FLUORO-6-DEOXY-6-DEMETHYL-4-DESDIMETHYLAMINOTETRACYCLINE The product of Example XVIII, 2.0 g., is dissolved in acetic acid and 0.8 g. of N-chlorosuccinimide in 30 ml. of acetic acid is added to the mixture. The mixture is allowed to stand for 24 hours and the product is then precipitated by water addition. The mixture is filtered and the product washed and dried.

Example XXI

Employing the procedures of Examples XI to XX, the following halodesdimethylaminotetracyclines are prepared:

7,9-dichloro-11a-fluoro-6-deoxy-4-desdimethylaminotetracycline
7,9-dichloro-6-deoxy-4-desdimethylaminotetracycline
7,9-diiodo-6-deoxy-4-desdimethylaminotetracycline
7,9-dibromo-6-deoxy-4-desdimethylaminotetracycline
7,9,11a-trichloro-6-deoxy-4-desdimethylaminotetracycline
7-fluoro-9,11a-dibromo-6-deoxy-4-desdimethylaminotetracycline
7-chloro-6-deoxy-6-demethyl-4-desdimethylaminotetracycline
7,9-dibromo-6-deoxy-4-desdimethylamino-5-oxytetracycline
7,9-diiodo-11a-fluoro-6-deoxy-6-demethyl-4-desdimethylaminotetracycline
7,9-diiodo-6-deoxy-6-demethyl-4-desdimethylaminotetracycline

Example XXII
7-BROMO-6-DEOXY-6-DEMETHYLTETRACYCLINE

To 1 g. of 7,11a-dibromo-6-demethyl-6-deoxytetracycline hydrobromide in 20 ml. of water is added with stirring 320 mg. of potassium sulfite dissolved in 5 ml. water. After stirring for 30 minutes at room temperature, filtration of the reaction mixture yields 650 mg. of the product.

Example XXIII
7-CHLORO-6-DEMETHYL-6-DEOXYTETRACYCLINE

To a solution of 520 mg. of 7,11a-dichloro-6-deoxy-6- demethyltetracycline in 5 ml. of water is added with stirring 175 mg. of sodium hydrosulfite and an immediate yellow precipitate forms which upon filtration of the reaction mixture gave 430 mg. of 7-chloro-6-demethyl-6-deoxytetracycline.

*Example XXIV*

The hydrochloride of 7,11a-dichloro-6-deoxy-6-demethyltetracycline is prepared by dissolving the tetracycline compound in methanol containing an equivalent amount of hydrogen chloride. The hydrochloride salt is then obtained by concentration of the reaction mixture.

In this fashion, other mineral acid salts of the present new compounds are prepared with such acids as hydrobromic, sulfuric, hydriodic, phosphoric, and hydrofluoric acids.

*Example XXV*

The sodium salt of 7,11a-dichloro-6-deoxy-6-demethyltetracycline is prepared by dissolving the tetracycline compound in aqueous solution containing an equivalent amount of sodium hydroxide. Concentration of the resulting solution yields the sodium salt.

Similarly, other alkali and alkaline earth metal salts of the present new compounds are prepared using the following salts: potassium carbonate, lithium carbonate, barium hydroxide, calcium hydroxide, strontium carbonate, magnesium hydroxide.

*Example XXVI*

A suspension of 11a-chloro-6-deoxy-6-demethyltetracycline is prepared with the following composition:

| | |
|---|---:|
| Antibiotic ......g.. | 31.42 |
| 70% aqueous sorbitol ......g.. | 714.29 |
| Glycerine, U.S.P. ......g.. | 187.35 |
| Gum acacia (10% aqueous solution) ......ml.. | 100 |
| Polyvinyl pyrrolidone ......g.. | 0.5 |
| Butyl parahydroxybenzoate (preservative) ......g.. | 0.172 |
| Propyl parahydroxybenzoate (preservative) ......g.. | 0.094 |
| Water, distilled, to make 1 liter. | |

To this suspension, various sweetening and flavoring agents, as well as acceptable colors, may be added by choice. The suspension contains approximately 25 mg. of antibiotic activity per milliliter.

*Example XXVII*

A solution of 11a-chloro-6-deoxy-6-demethyltetracycline is prepared with the following composition:

| | |
|---|---:|
| Antibiotic ......g.. | 30.22 |
| Magnesium chloride hexahydrate ......g.. | 12.36 |
| Monoethanolamine ......ml.. | 8.85 |
| Propylene glycol ......g.. | 376 |
| Water ......ml.. | 94 |

The solution has a concentration of 50 mg./ml. and is suitable for parenteral, and especially for intramuscular administration.

*Example XXVIII*

A tablet base is prepared by blending the following ingredients in the proportion by weight indicated.

| | Grams |
|---|---:|
| Sucrose, U.S.P. | 80.3 |
| Tapioca starch | 13.2 |
| Magnesium stearate | 6.5 |

Into this base there is blended sufficient 11a-chloro-6-deoxy-6-demethyltetracycline to provide tablets containing 25, 100 and 250 mg. of active ingredient.

*Example XXIX*

A blend is prepared containing the following ingredients:

| | Grams |
|---|---:|
| Calcium carbonate, U.S.P. | 17.6 |
| Dicalcium phosphate | 18.8 |
| Magnesium trisilicate, U.S.P. | 5.2 |
| Lactose, U.S.P. | 5.2 |
| Potato starch | 5.2 |
| Magnesium stearate A | 0.8 |
| Magnesium stearate B | 0.32 |

To this blend is added sufficient 11a-chloro-6-deoxy-6-demethyltetracycline to provide capsules containing 25, 100 and 250 mg. of active ingredient.

*Example XXX*

One thousand grams of 11a-chloro-6-deoxy-6-demethyltetracycline are intimately mixed and ground with 2500 grams of ascorbic acid. The ground, dry mixture is filled into vials, sterilized with ethylene oxide and the vials sterilely stoppered. For intravenous administration sufficient water is added to the vials to form a solution containing 10 mg. of active ingredient per milliliter.

The procedures of Examples XXVI–XXX is repeated with other 11a-halotetracyclines described in the preceding examples to form corresponding dosage forms.

This application is a continuation-in-part of application Serial No. 847,866, filed October 22, 1959, now abandoned.

What is claimed is:

1. A compound selected from the group consisting of compounds of the formula:

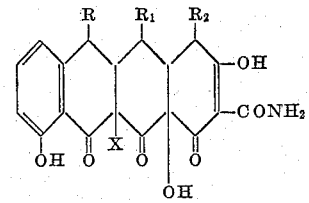

wherein:

R is selected from the group consisting of H and $CH_3$;
$R_1$ is selected from the group consisting of H and, when R is $CH_3$, OH;
$R_2$ is selected from the group consisting of hydrogen and $-N(CH_3)_2$; and X is halogen;

and the mineral acid salts thereof and alkali and alkaline earth metal salts thereof.

2. A compound selected from the group consisting of compounds of the formulae:

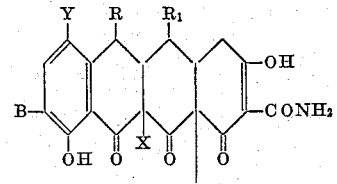

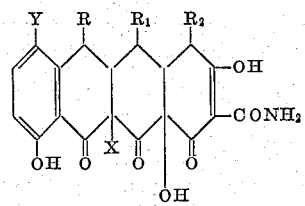

wherein:

R is selected from the group consisting of H and $CH_3$;
$R_1$ is selected from the group consisting of H and, when R is $CH_3$, OH;
$R_2$ is selected from the group consisting of H and $N(CH_3)_2$;
X and Y are halogen; and
B is selected from the group consisting of chloro, bromo and iodo;

and the mineral acid salts thereof and alkali and alkaline earth metal salts thereof.

3. 11a-chloro-6-deoxy-6-demethyltetracycline.
4. 11a-bromo-6-deoxy-6-demethyltetracycline.
5. 11a-fluoro-6-deoxytetracycline.
6. 11a-bromo-6-deoxy-5-oxytetracycline.
7. 7,9,11a - tribromo-6-deoxy - 6 - demethyl-4-desdimethylaminotetracycline.
8. 7,9-dibromo-11a-fluoro-6-deoxy-6-demethyl-4-desdimethylaminotetracycline.
9. 7,9-dibromo-11a-fluoro-6-deoxy-4-desdimethylaminotetracycline.
10. 7-bromo-11a-fluoro-6-deoxy-6-demethyl - 4 - desdimethylaminotetracycline.
11. 7,9 - diiodo-11a-fluoro-6-deoxy-6-demethyl-4-desdimethylaminotetracycline.
12. 11a-fluoro-6-deoxy-6-demethyltetracycline.
13. 11a-iodo-6-deoxy-6-demethyltetracycline.
14. 7,11a-dichloro-6-deoxy-6-demethyltetracycline.
15. 11a-bromo-6-deoxytetracycline.
16. 7,9,11a-tribromo - 6 - deoxy - 6 - demethyl-4-desdimethylaminotetracycline.
17. Compounds selected from the group consisting of compounds of the formula:

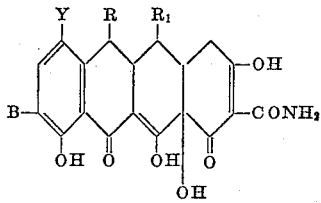

in which:

R is selected from the group consisting of H and $CH_3$;
$R_1$ is selected from the group consisting of H and, when R is $CH_3$, OH;
Y is halogen; and
B is selected from the group consisting of bromo, chloro, and iodo;

and alkali and alkaline earth metal salts thereof.

18. The process for the 11a-dehalogenation of a 6-deoxy-11a-halotetracycline selected from the group consisting of

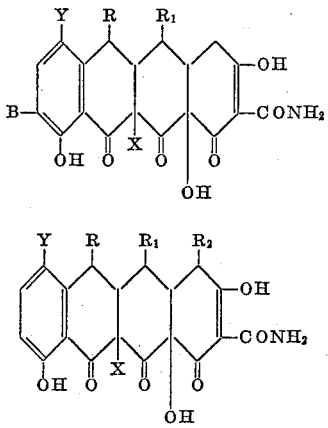

and mineral acid salts thereof wherein

R is selected from the group consisting of H and $CH_3$;
B is selected from the group consisting of chloro, bromo and iodo;
$R_1$ is selected from the group consisting of H and, when R is $CH_3$, OH;
$R_2$ is selected from the group consisting of H and $N(CH_3)_2$;
X and Y are each selected from the group consisting of chloro, fluoro and bromo;

which comprises treating said 6-deoxy-11a-halotetracycline with at least one equivalent of each of zinc and sodium iodide in a reaction inert solvent.

19. The process for the 11a-dehalogenation of a 6-deoxy-11a-halotetracycline selected from the group consisting of

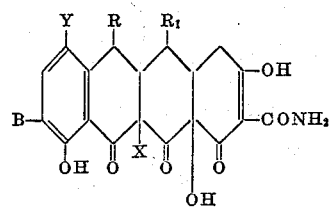

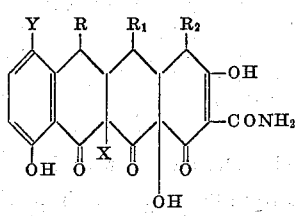

and mineral acid salts thereof wherein

R is selected from the group consisting of H and $CH_3$;
B is selected from the group consisting of chloro, bromo and iodo;
$R_1$ is selected from the group consisting of H and, when R is $CH_3$, OH;
$R_2$ is selected from the group consisting of H and $N(CH_3)_2$;
X and Y are each selected from the group consisting of chloro, fluoro and bromo;

which comprises treating said 6-deoxy-11a-halotetracycline with hydrogen in the presence of a noble metal catalyst at a pressure of from about one to about three atmospheres and a temperature of up to about 50° C. in a reaction-inert solvent until one equivalent of hydrogen is taken up.

20. The process for the 11a-dehalogenation of a 6-deoxy-11a-halotetracycline selected from the group consisting of

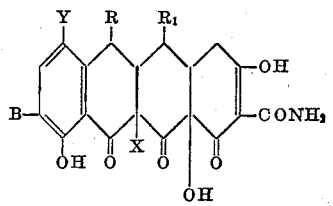

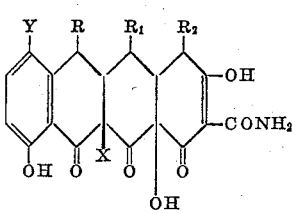

and mineral acid salts thereof wherein

R is selected from the group consisting of H and $CH_3$;
B is selected from the group consisting of chloro, bromo and iodo;
$R_1$ is selected from the group consisting of H and, when R is $CH_3$, OH;
$R_2$ is selected from the group consisting of H and $N(CH_3)_2$;
X and Y are each selected from the group consisting of chloro, fluoro and bromo;

which comprises treating said 6-deoxy-11a-halotetracycline with zinc metal in acetic acid.

21. The process for the 11a-dehalogenation of a 6- deoxy-11a-halotetracycline selected from the group consisting of

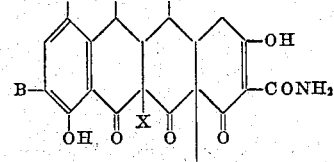

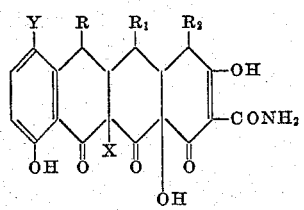

and mineral acid salts thereof wherein

R is selected from the group consisting of H and $CH_3$;
B is selected from the group consisting of chloro, bromo and iodo;
$R_1$ is selected from the group consisting of H and, when R is $CH_3$, OH;
$R_2$ is selected from the group consisting of H and $N(CH_3)_2$;
X and Y are each selected from the group consisting of chloro, fluoro and bromo;

which comprises treating said 6-deoxy-11a-halotetracycline with an aqueous solution of an alkali metal hydrosulfite.

References Cited in the file of this patent

UNITED STATES PATENTS

| | | |
|---|---|---|
| 2,736,725 | Ritter | Feb. 28, 1956 |

FOREIGN PATENTS

| | | |
|---|---|---|
| 167,948 | Australia | Mar. 18, 1954 |
| 167,750 | Australia | May 6, 1954 |
| 215,191 | Australia | Aug. 30, 1956 |
| 785,047 | Great Britain | Oct. 23, 1957 |

OTHER REFERENCES

Stephens et al.: J. Amer. Chem. Soc., vol. 80, pages 5324–5325 (1958).